(12) United States Patent
Yamagiwa

(10) Patent No.: US 7,522,881 B2
(45) Date of Patent: Apr. 21, 2009

(54) VEHICLE

(75) Inventor: Toshio Yamagiwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 10/801,694

(22) Filed: Mar. 17, 2004

(65) Prior Publication Data

US 2004/0203360 A1 Oct. 14, 2004

(30) Foreign Application Priority Data

Mar. 19, 2003 (JP) ............................. 2003-075587

(51) Int. Cl.
*H04B 7/00* (2006.01)
*H04M 1/00* (2006.01)
*H04M 1/66* (2006.01)
*H04M 1/68* (2006.01)

(52) U.S. Cl. .................... 455/41.2; 455/575.9; 455/411

(58) Field of Classification Search ............... 455/41.2, 455/575.8–575.9, 95, 96, 99, 410, 411, 41.3, 455/575.1, 556.1, 3.06; 296/37.15, 37.16
See application file for complete search history.

(56) References Cited

U.S. PATENT DOCUMENTS

| | | |
|---|---|---|
| 5,731,957 A | 3/1998 | Brennan |
| 5,838,233 A * | 11/1998 | Hawes et al. ............. 340/572.5 |
| 6,246,919 B1 | 6/2001 | Hassel |
| 6,459,426 B1 | 10/2002 | Eglit et al. |
| 6,505,780 B1 * | 1/2003 | Yassin et al. ................ 235/492 |

FOREIGN PATENT DOCUMENTS

| | | |
|---|---|---|
| DE | 2752954 A1 | 5/1979 |
| DE | 3313481 A1 | 10/1984 |
| DE | 19607294 A1 | 8/1997 |
| EP | 0977137 A2 | 2/2000 |
| FR | 2704670 A1 | 11/1994 |
| JP | 2002-169858 A | 6/2002 |
| JP | 2003-077072 A | 3/2003 |
| NL | 9101758 | 10/1991 |

* cited by examiner

*Primary Examiner*—Eugene Yun
(74) *Attorney, Agent, or Firm*—Birch, Stewart, Kolasch & Birch, LLP

(57) ABSTRACT

To provide a vehicle in which information regarding RFID (Radio Frequency Identification) is easily read and written by attaching a tag at a position where electromagnetic waves can be received. A vehicle includes a tag mounted thereon. The tag includes a recording medium in which identification information for identifying the vehicle is registered. The tag is attached inside a resin member. In particularly, the tag is attached inside a vehicle seat composed of a resin member. Furthermore, a tag can be attached as described above in a saddle-type vehicle.

11 Claims, 11 Drawing Sheets

FIG. 6

VEHICLE INFORMATION DATABASE
OWNER DATA

| VEHICLE ID | OWNER | | ADDRESS | |
| --- | --- | --- | --- | --- |
| | NAME | DATE OF BIRTH | | |
| | | | | |
| | | | | |
| | | | | |
| | | | | |
| | | | | |
| | | | | |
| | | | | |
| | | | | |
| | | | | |
| | | | | |

FIG. 8

VEHICLE INFORMATION DATABASE
VEHICLE HISTORY DATA

VEHICLE ID
DATE

| BRIEF HISTORY | DETAIL |
|---|---|
| NEW VEHICLE PRODUCTION | OO GIKEN INDUSTRY, OO PLANT |
| OWNER REGISTRATION | OWNER NAME, ADDRESS |
| FILLING | FILLING STATION, QUANTITY OF FUEL |
| FILLING | FILLING STATION, QUANTITY OF FUEL |
| FILLING | FILLING STATION, QUANTITY OF FUEL |
| REPAIR | REPAIR SHOP, REPAIR DETAIL |
| FILLING | FILLING STATION, QUANTITY OF FUEL |
| OWNER CHANGE | OWNER NAME, ADDRESS |
| . . . | |
| UNREGISTRATION | |
| MANIFEST ISSUE | |

FIG. 9

VEHICLE INFORMATION DATABASE
MANIFEST ISSUE DATA

| | |
|---|---|
| | |
| | |
| | |
| | |
| | |

VEHICLE INFORMATION DATABASE
MANIFEST ISSUE DATA
VEHICLE ID
MANIFEST ISSUED FLAG
DISPOSAL TREATMENT CODE

| | |
|---|---|
| WASTE GENERATOR INFORMATION | PUBLIC KEY OF WASTE GENERATOR |
| COLLECTOR/TRANSPORTER INFORMATION | PUBLIC KEY OF COLLECTOR/TRANSPORTER |
| INTERMEDIATE TREATMENT COMPANY INFORMATION | PUBLIC KEY OF INTERMEDIATE TREATMENT COMPANY |
| FINAL DISPOSAL COMPANY INFORMATION | PUBLIC KEY OF FINAL DISPOSAL COMPANY |

VEHICLE

CROSS-REFERENCE TO RELATED APPLICATIONS

This nonprovisional application claims priority under 35 U.S.C. § 119(a) on Patent Application No. 2003-075587, filed in Japan on Mar. 19, 2003, the entirety of which is incorporated herein by reference.

BACKGROUND OF THE INVENTION

1. Field of the Invention

The present invention relates to an article management method for managing an article, especially transportation equipment such as an automobile, a motorcycle, a ship, and an airplane over the lifecycle thereof. In addition, the present invention relates to an article management system. Specifically, the present invention relates to the manner of attaching a tag in an article management system.

2. Description of Background Art

A technique of managing an article by use of RFID (Radio Frequency IDentification) has been widely used and is increasing in use gradually. This is a technique of managing where each article is stocked and the like by using a computer as follows. The RFID (also called an IC tag, a radio tag, or an electronic tag) is attached to an article or a packing material thereof, and information for identifying a type of the article or the individual article is read from the RFID in a distribution process of the article and the like. Herein, the RFID is a small tag, which includes an IC (Integrated Circuit) and means for transmitting/receiving radio signals embedded therein.

Japanese Patent Laid-Open Publication No. 2002-169858 discloses a system which enables an article such as a vehicle to be managed from production to disposal in the following manner. The RFID (tag) is kept fixed to the article from production to disposal thereof. Information which is specific to the article and stored in an IC within the RFID is designed to be read by a computer. In this system, any one of inventory management, delivery management, distribution management, maintenance management, and customer management is included from production to disposal. Japanese Patent Laid-Open Publication No. 2002-169858 discloses a technology of fixing the RFID to a chassis frame made of sheet steel (FIGS. 2 and 3, paragraph [0007]), an electromagnetic shielding board which electromagnetically shields an antenna of the RFID from the chassis frame made of sheet steel (FIG. 2, pl. 0009), and a technology of fixing the RFID to a side surface of the chassis frame and a bottom surface or a bumper of a monocoque body (FIG. 5, paragraph [0020]).

In the case where the RFIC was fixed to the chassis frame of a vehicle using the conventional technology as described above, since the entire chassis frame was covered with the vehicle body made of metal, read/write signals (electromagnetic waves) for the RFID were blocked by the vehicle body. Therefore, in order to read/write information from/to the RFID, it was required to get under the body and bring an RFID reader/writer close to the chassis. This procedure is very inconvenient.

SUMMARY OF THE INVENTION

The present invention has been made to solve the aforementioned problems, and an object of the present invention is to provide a vehicle which includes a tag attached at a position around which there is no material blocking electromagnetic waves and facilitates reading and writing information of the RFID.

In order to solve the above-described problems, according to a first aspect of the present invention, a vehicle includes a tag mounted therein, the tag including a recording medium in which identification information for identifying a vehicle is registered. In addition, the tag is attached inside a resin member. With this configuration, the read/write signals (electromagnetic waves) for the tag can be transmitted through the resin member.

In addition, according to a second aspect of the present invention, in the vehicle according to the present invention, the tag can is attached inside a vehicle seat composed of a resin member.

Furthermore, according to a third aspect of the present invention, the vehicle is a saddle-type vehicle. In saddle-type vehicles, each section of the vehicle body is exposed to the exterior space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a schematic view illustrating a data structure of owner data included in a vehicle information database in the embodiment;

FIG. 8 is a schematic view illustrating a data structure of vehicle history data included in the vehicle information database in the embodiment;

FIG. 9 is a schematic view illustrating a data structure of an outline of manifest data included in the vehicle information database in the embodiment;

DETAILED DESCRIPTION OF THE PREFERRED EMBODIMENTS

Figure 1:
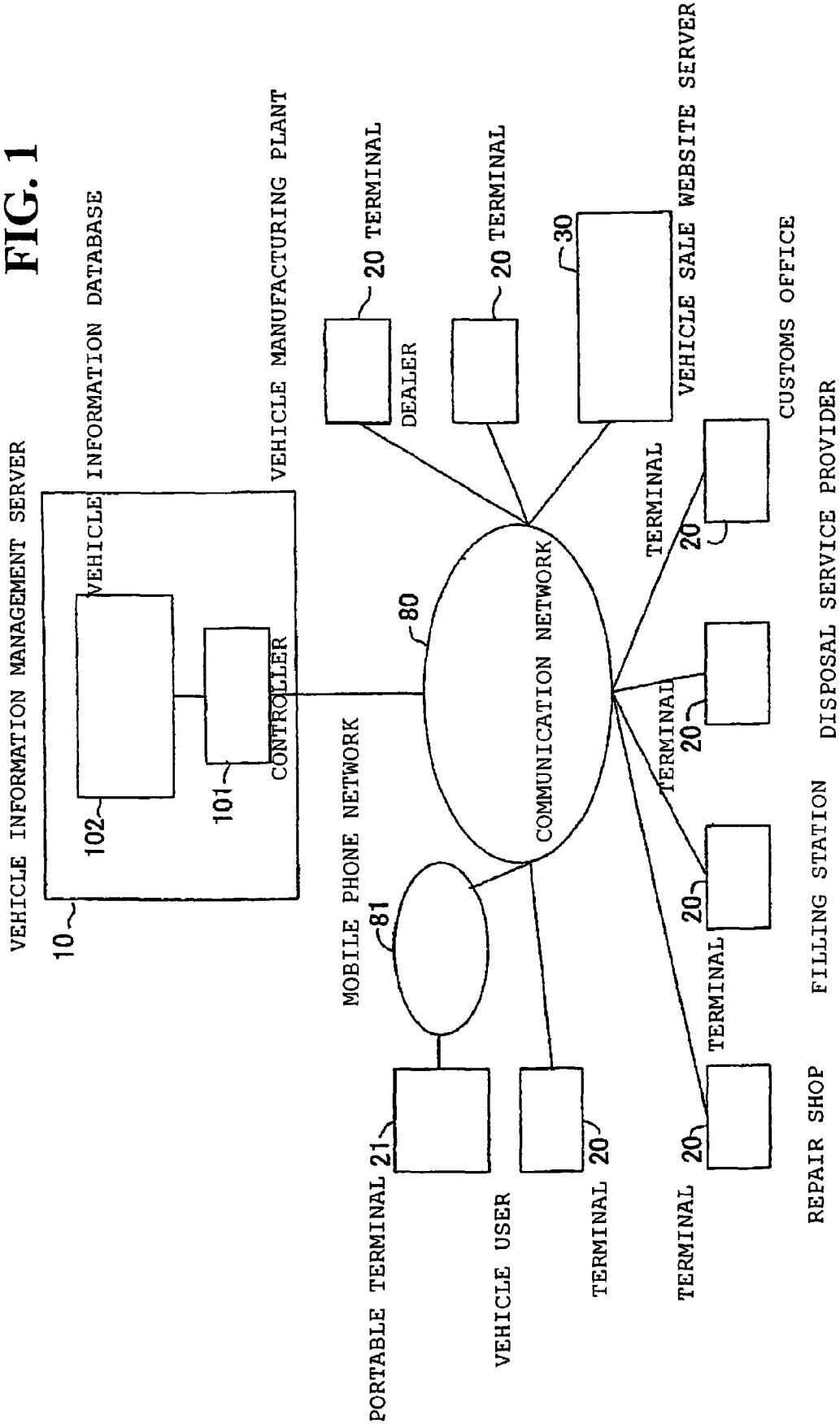
FIG. 1 is a block diagram illustrating a configuration of a vehicle management system according to one embodiment of the present invention.

The present invention will now be described with reference to the accompanying drawings. It should be noted that the same or similar elements have been identified by the same reference numerals throughout the several views.

FIG. 1 is a block diagram showing a configuration of a vehicle management system according to the embodiment. In FIG. 1, the reference numeral 10 denotes a vehicle information management server. This vehicle information management server 10 includes a controller 101 (identifying means, means for outputting information, means for storing information for identifying a target vehicle, comparing means, means for extracting owner information, manifest issuing means, and means for outputting dumped article information) and a vehicle information database 102 (means for storing article information, means for storing part configuration information, means for storing owner information, and means for storing waste treatment information). In addition, the reference numeral 20 denotes terminals provided for vehicle manufacturing plants, vehicle dealers, vehicle repair shops, filling stations, disposal service providers, customs offices, and houses of vehicle users. Note that an RFID reader/writer (means for reading tag information) is connected to each terminal 20 if necessary, and it is allowed to easily read and write information of a memory within the RFID provided for a vehicle or the RFID embedded in a vehicle registration certificate. Note that the disposal service providers include waste generators which discharge waste, waste collectors/transporters which collect and transport the discharged waste, intermediate treatment companies which perform intermediate treatment for waste, final disposal companies which perform final disposal after the intermediate treatment, and the like. The reference numeral 21 denotes, for example, a portable terminal owned by a vehicle user. The reference numeral 30 denotes a server in a vehicle sale website which is provided for selling vehicles by using a so-called web interface via a communication network.

The reference numeral 80 denotes a communication network. The vehicle information management server 10, the terminals 20, the portable terminal 21, and the server 30 in the vehicle sale website can communicate with each other via this communication network 80. Note that the portable terminal 21 can be connected to the communication network 80 via a mobile phone network 81. Herein, the mobile phone network 81 and the communication network 80 are connected to each other via a gateway device or the like (not shown).

In the vehicle information management server 10, the vehicle information database 102 holds management information for each vehicle over the entire lifecycle of the vehicle from a stage when the vehicle is shipped from the plant to a stage when the vehicle is disposed of. In addition, as will be described below, the controller 101 refers to data stored in the vehicle information database 102 and writes data in the vehicle information database 102 while exchanging data with the terminals 20, the portable terminal 21, the vehicle sale website server 30, and the like.

It should be noted that the vehicle information management server 10, the terminals 20, and the vehicle sale website server 30 are implemented by using computers. In addition, a portable telephone terminal (mobile phone terminal or PHS (Personal Handyphone System, trademark) terminal), a PDA (Personal Digital Assistant), or the like is used as the portable terminal 21. Each of these devices is provided with a CPU (Central Processing Unit) inside. Each process of processing conducted by each of these devices is stored in a computer-readable recording medium in the form of a computer program. Each CPU reads and executes the program to perform the above processing. Herein, the computer-readable recording medium is a magnetic disk, a magneto-optical disk, a CD-ROM, a DVD-ROM, a semiconductor memory, or the like. The computer program may be distributed to a computer through a communication line and executed by a CPU provided in the computer, which has received the distribution.

A description will now be given of means for identifying individual vehicles in this system. Each vehicle is provided with a RFID, which can be identified by a vehicle ID. This RFID 72 includes a semiconductor memory embedded inside. The semiconductor memory includes both a non-rewritable area and a rewritable area. In the non-rewritable area, at least the vehicle ID for identifying the vehicle is written in advance.

Figure 2:
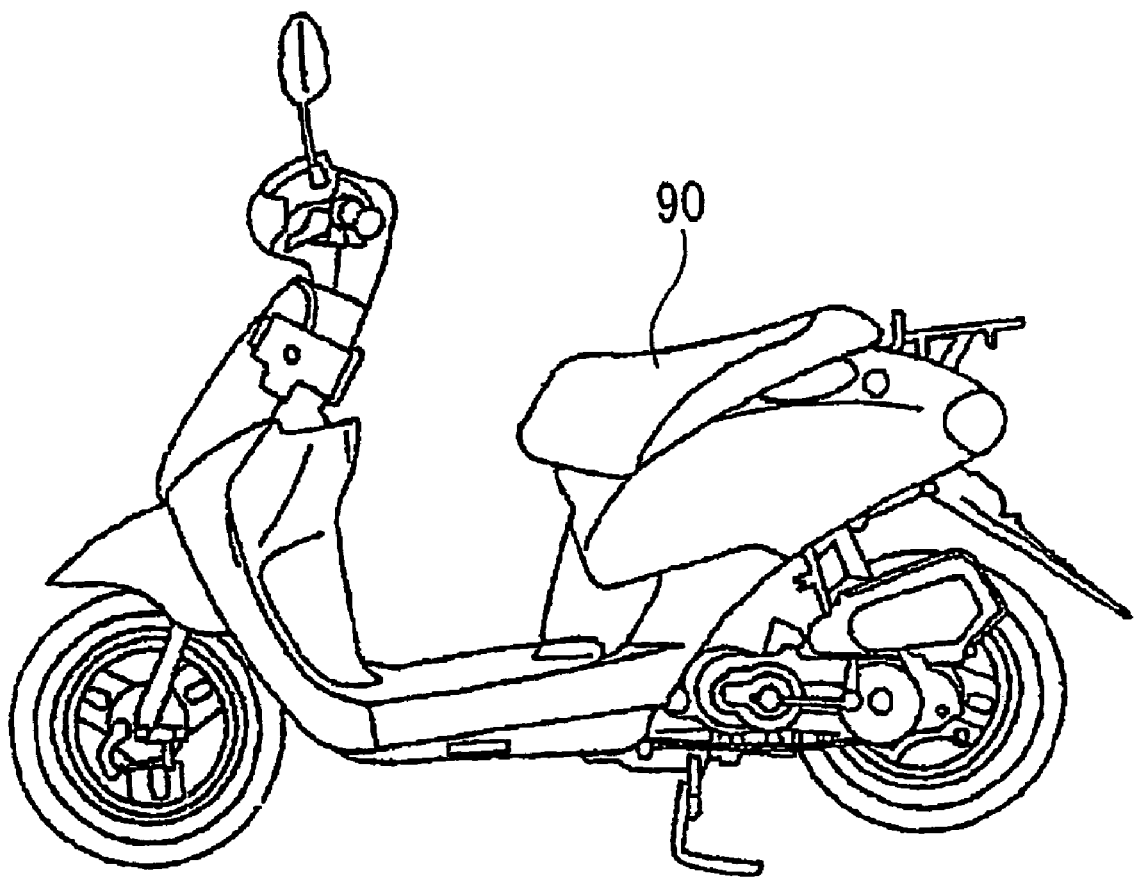
FIG. 2 is a schematic view illustrating rough places to which an RFID is attached in a vehicle (motorcycle) in the embodiment.

FIG. 2 is a schematic view illustrating places to which the RFID is attached if the vehicle is a motorcycle. In FIG. 2, the reference numeral 90 denotes a seat for a person to ride on. The seat is made of a resin member. The aforementioned RFID is designed to be attached inside the seat.

Figure 3:
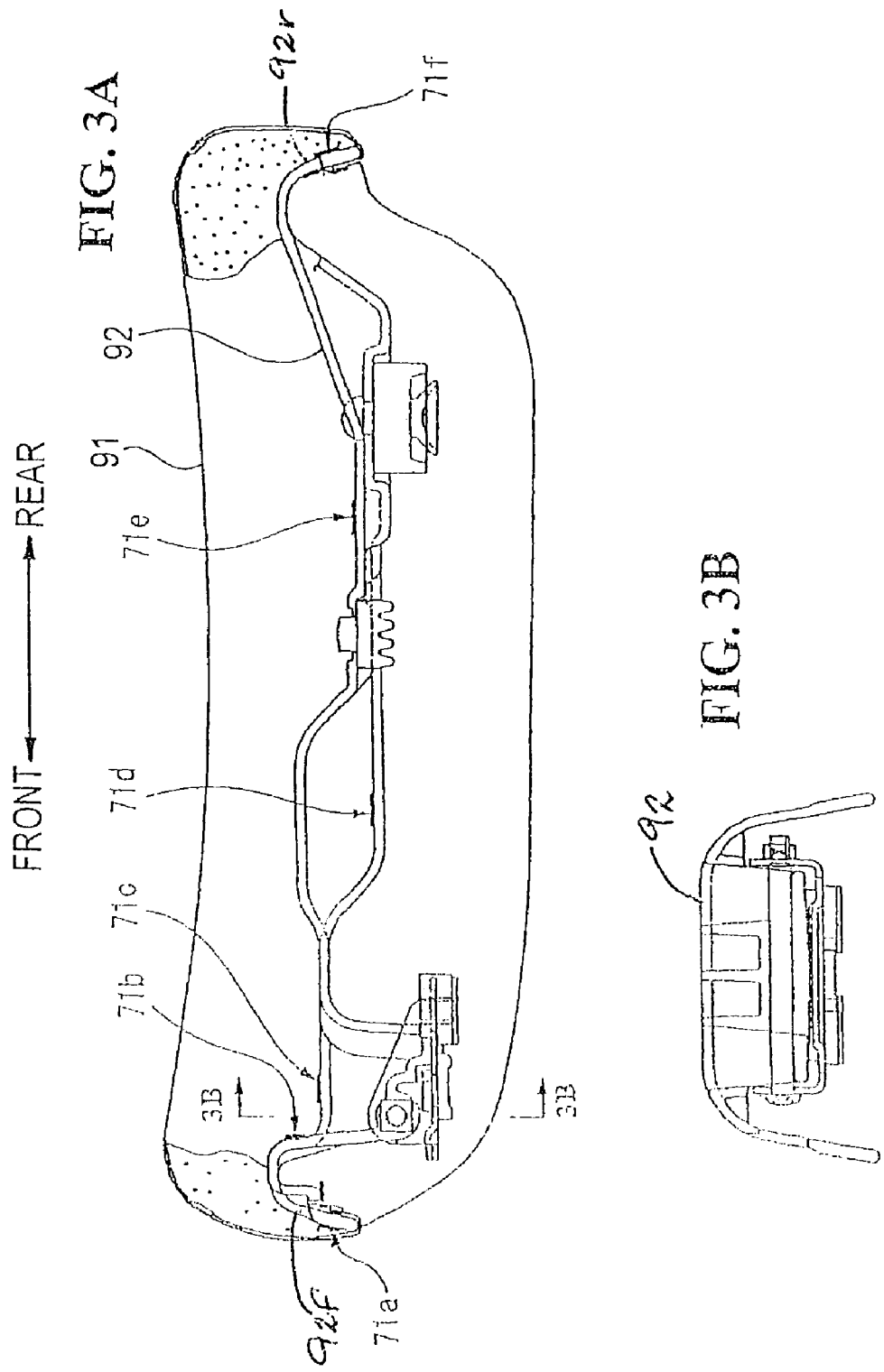
FIG. 3A is a cross-sectional view of a seat illustrating the places where the RFID can be attached in more detail in the embodiment.
FIG. 3B is a cross-section along the line 3B-3B in FIG. 3A.

FIG. 3A is a cross-sectional view of the seat in the longitudinal direction. The reference numerals 71a, 71b, 71c, 71d, 71e, and 71f denote examples of positions where the RFID can be mounted in the seat. The RFID may be attached to any of the positions 71a to 71f. Particularly in the case where the RFID is attached to the position 71a or 71f, the RFID reader/writer can be brought closer to the RFID because the distance between the surface of the seat and the RFID is short. It should be noted that the FIG. 3B is a cross-sectional view along the line 3B-3B of FIG. 3A.

As shown in FIG. 3A, the resin member forming the vehicle seat 90 has a certain degree of vertical thickness to function as a buffer for the rider. The vehicle seat 90 includes an internal member 92 extending between a front and a rear of the vehicle seat 90. A front side 92f of the internal member 92 faces substantially in a forward direction, and a rear side 92r of the internal member 92 faces substantially in a rearward direction. Vehicle seat 90 has a seat surface 91, a central portion of which the rider sits upon. Therefore, when the RFID is attached to positions 71b, 71c, 71d, or 71e away from front and rear sides 92f, 92r of the internal member 92, the distance between the RFID and the seat surface 91 is comparatively long. On the contrary, when the RFID is attached to the front side 92f or the rear side 92r of the internal member 92 of the vehicle seat 90, such as the positions 71a or 71b within the vehicle seat 90, the distance to the front or rear of the seat surface 91 is comparatively short, respectively. Therefore, when the distance that read/write signals (electromagnetic waves) for the RFID travel over is comparatively short, the RFID is provided at the position whose distance to the front or rear of the seat surface is relatively short, for example the positions 71a or 71b. This allows the reader to be brought closer to the RFID, thus facilitating reading and writing.

It should be noted that although FIG. 2 and FIGS. 3A and 3B show the attachment positions of the RFID in the case of the motorcycle (the same is true in a motorized bicycle), the RFID can be provided inside the seat in saddle type vehicles such as bicycles, personal water crafts (PWC), and all terrain vehicles in addition to motorcycles. Since the seat is made of a resin member which allows the transmission of electromagnetic waves therethrough, attaching the RFID inside the seat as described above is advantageous for reading and writing information, which is stored in the RFID, by using electromagnetic waves. Normally, a saddle type vehicle does not include a metallic roof covering above the seat and the like. Therefore, attaching the RFID inside the seat is convenient because the RFID reader/writer can be installed, for example, over the position where vehicles stop, for example, in filling stations, repair shops, on the road, and the like. In addition, while the RFID is designed to be fixed to the vehicle from production to disposal of the vehicle, there is an advantage that providing the RFID inside the seat causes the RFID not to be removed easily.

It should be noted that in the case of vehicles including a metallic roof such as cars, buses, and trucks, the RFID can be attached inside the seat, and information of the RFID is read or written by bringing a handy reader/writer inside the vehicle. Alternatively, the RFID can be attached near a front or rear window of a car. For example, the RFID may be attached to a dashboard part, and reading and writing for the RFID may be performed from the upper outside of the vehicle and the like. In addition, the RFID may be attached inside a resin member forming the dashboard part.

Figure 4:
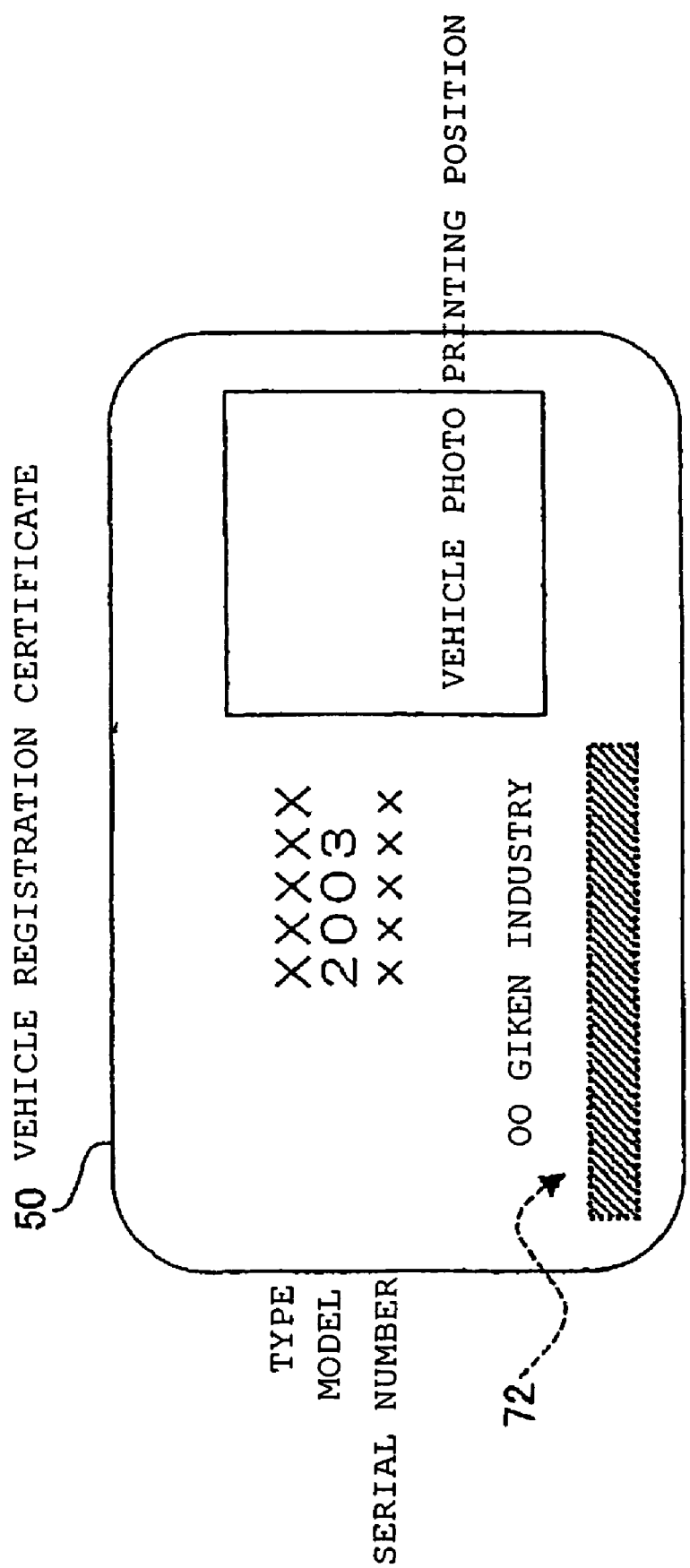
FIG. 4 is a schematic view illustrating an example of a face of the vehicle registration certificate in the embodiment.

The vehicle registration certificate used in this system will now be described. FIG. 4 is a schematic view showing an example of a face of the vehicle registration certificate. In this drawing, a vehicle registration certificate 50 is a certificate issued for each vehicle. As shown in the drawing, on the face of the vehicle registration certificate, a type, a model year (displayed as "model 2003"), a serial number, and a manufacturer's name of a vehicle of interest are described, and a photograph of the vehicle is printed or attached. In addition, the reference numeral 72 denotes an RFID embedded in the vehicle registration certificate 50. The RFID 72 includes a semiconductor memory embedded therein. The semiconductor memory includes both a non-rewritable area and a rewritable area.

Note that this vehicle registration certificate is assumed to be issued by a manufacturer which manufactures the vehicle, a public institution which manages vehicle registration, or the like. In addition, the vehicle registration certificate is as large as a credit card having a size of, for example, 5.3 centimeters high by 8.5 centimeters wide, and the material thereof is plastic or the like.

Figure 5:
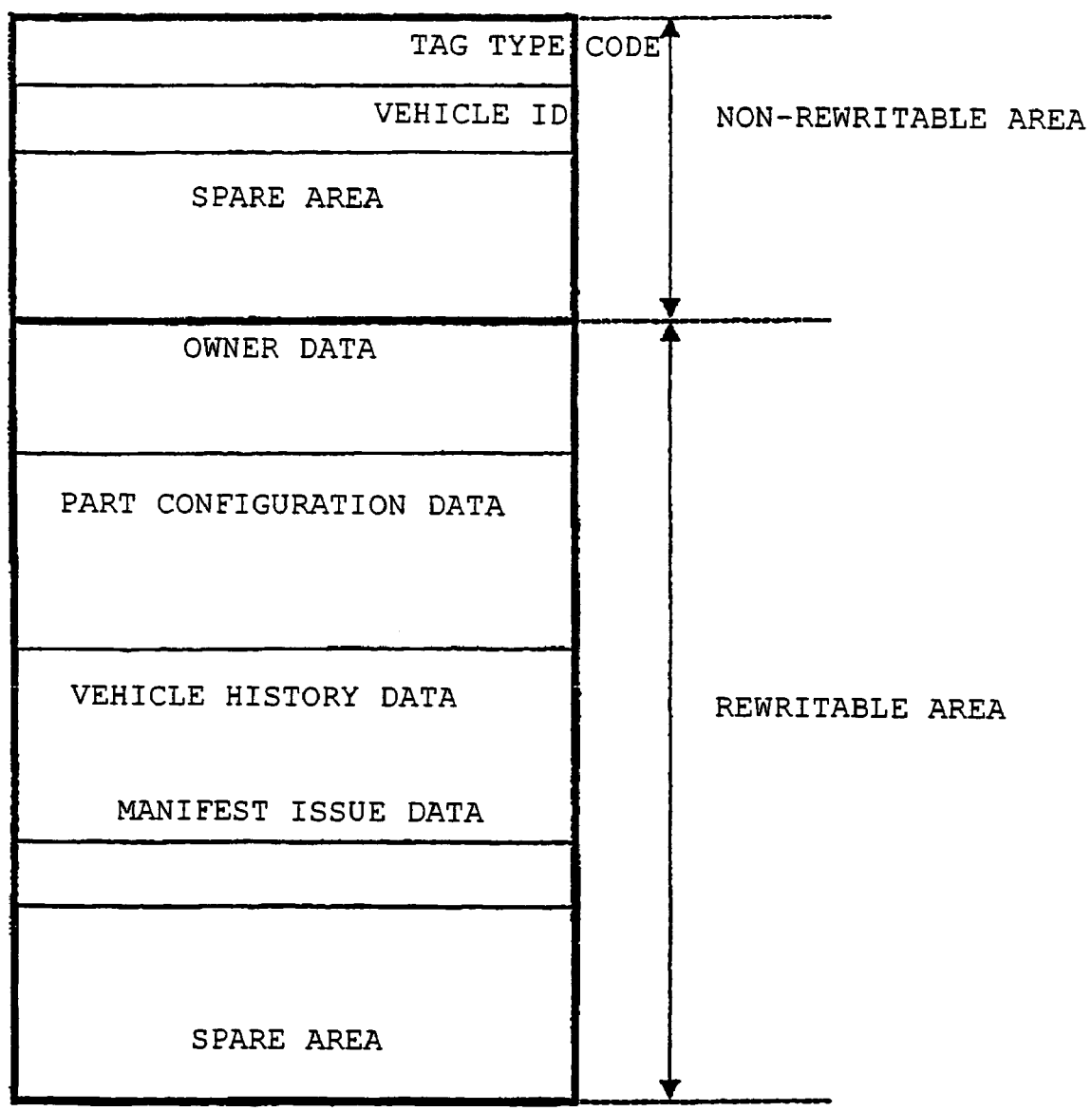
FIG. 5 is a schematic view illustrating a configuration of data stored in a memory within the RFID in this embodiment.

A description will now be given of information held by the RFID provided in the vehicle and the RFID 72 embedded in the vehicle registration certificate 50. FIG. 5 is a schematic view showing a configuration of data stored in the memories within the RFIDs. As shown in the drawing, each memory includes a non-rewritable area and a rewritable area. The non-rewritable area is inhibited from being rewritten by using a read-only-memory (ROM). Alternatively, a control is made so that the non-rewritable area is not be rewritten with a control function that the RFIDs include.

The non-rewritable area stores a tag type code and the vehicle ID, and further includes a spare area. The tag type code is code information for discriminating whether the RFID is the RFID provided in the vehicle or the RFID provided in the vehicle registration certificate. The vehicle ID is code information for individually identifying the vehicle.

In addition, the rewritable area stores owner data, part configuration data, vehicle history data, and manifest issue data, and further includes a spare area. In terms of the owner data, part configuration data, vehicle history data, and manifest issue data, the same information is held and managed in the vehicle information database 102 as will be described below. In this system, the vehicle management server 10 and the terminals 20 can communicate with each other via the communication network 80. Therefore, data (owner data, part configuration data, vehicle history data, and manifest issue data) stored in the vehicle information database 102 and data (owner data, part configuration data, vehicle history data, and manifest issue data) stored in the RFIDs are synchronously updated properly when needed. In addition, because the storage capacities of the RFIDs are limited, the vehicle information database 102 may be designed to hold a full set of each of the data sets, and each RFID is designed to hold only a subset of each of the data sets.

A description will now be given of each data set held by the vehicle information database 102 with reference to FIGS. 6 to 9. Part of or the entire data shown in FIGS. 6 to 9 is held also in the RFID side on a vehicle-by-vehicle basis. FIG. 6 is a schematic view showing the data structure of the owner data included in the vehicle information database. As shown in the drawing, the owner data includes the owner information associated with a vehicle ID. The owner information is information such as the name, date of birth, address, and the like of an owner.

Figure 7:
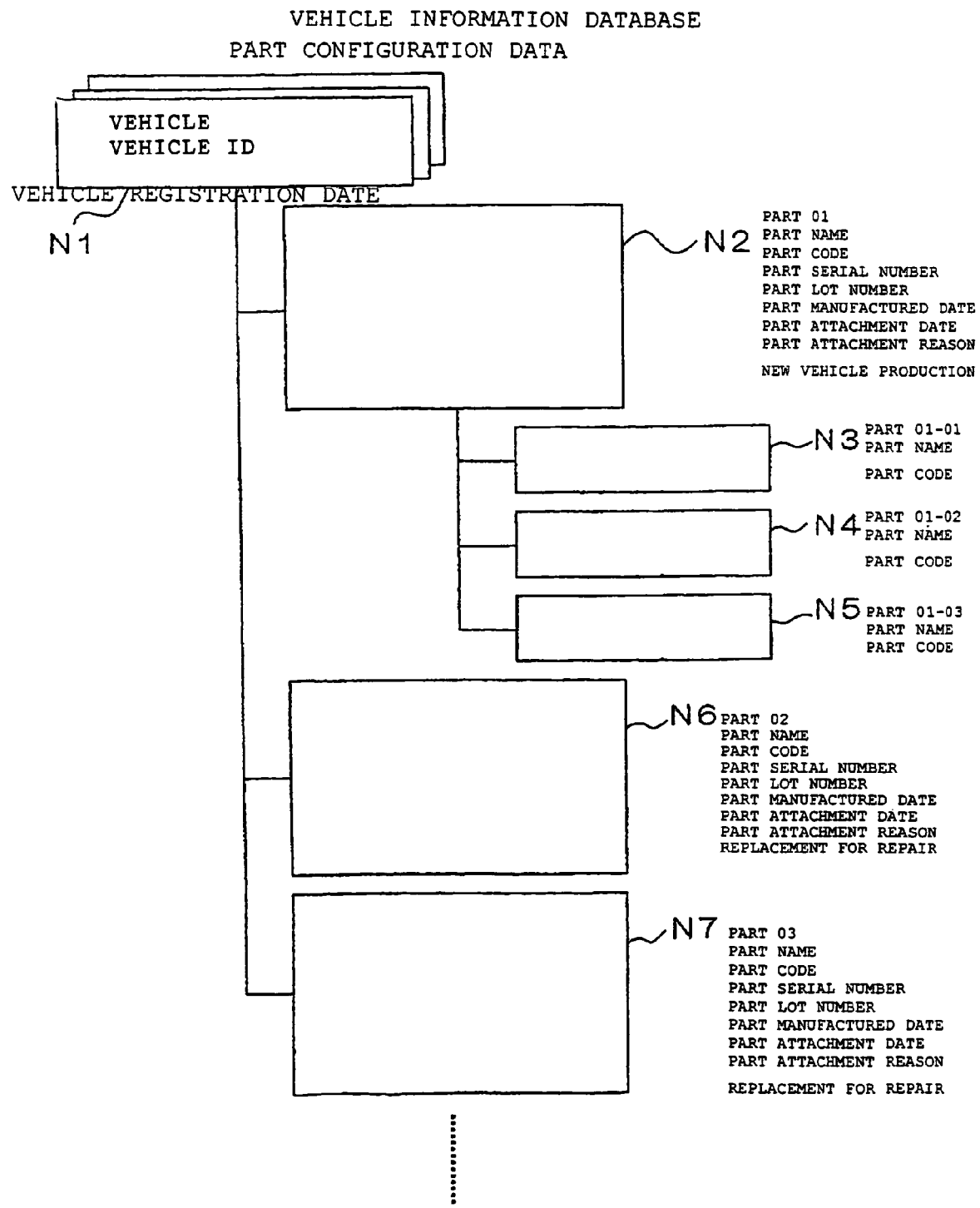
FIG. 7 is a schematic view illustrating a data structure of part configuration data included in the vehicle information database in the embodiment.

FIG. 7 is a schematic view showing the data structure of part configuration data included in the vehicle information database. As an example shown in the drawing, the part configuration data holds information on the part configuration on a vehicle-by-vehicle basis (in terms of each vehicle ID) as data having a tree structure. The reference numerals N1 to N7 denote nodes in this tree structure. The node N1 corresponds to a vehicle and includes data items such as the vehicle ID and the registration date of the vehicle. This vehicle is composed of a part 01, a part 02, a part 03, and so on. Pieces of information on these parts are stored in the node N2, node N6, and node N7, respectively. In addition, the parts have a hierarchical structure. For example, the part 01 is further composed of a part 01-01, a part 01-02, a part 01-03, and so on, and pieces of information on these parts are stored in the node N3, node N4, and node N5, respectively. Each of the nodes N2 to N7 includes data items such as a part name indicating a name of the part, a part code for identifying the type of the part, a part serial number assigned to each individual vehicle, a part lot number indicating a lot in manufacturing the part, a part manufactured date indicating the date when the part is manufactured, a part attachment date indicating the date when the part is attached to the vehicle or the date when the part is attached to the upper part, a part attachment reason (event, for example, such as "new vehicle production" and "replacement for repair") indicating a reason for attaching the part.

It should be noted that FIG. 7 exemplifies the case where the number of part hierarchies is two. However, there may be any number of hierarchies.

FIG. 8 is a schematic view showing the data structure of the vehicle history date included in the vehicle information database. In the example shown in the drawing, the vehicle history data holds history information on a vehicle-by-vehicle basis (in terms of each vehicle ID) and includes at least data items of a date, history summary, and details. Values of the item of history summary are, for example, "new vehicle production", "owner registration", "owner change", "filling", "repair", "unregistration", "manifest issue", and the like. In terms of the pieces of history information, information is generated in the terminals 20 each time the respective events occur. The information is written in the RFID provided in the vehicle or the RFID of the vehicle registration certificate when needed and transmitted from the terminals 20 to the controller 101. The controller 101 performs writing in the database based on the transmitted information.

It should be noted that when the history summary is "new vehicle production," a manufacturer name and a plant name are written as detailed data. When the history summary is "owner registration," the name and address of an owner and the like are written as detailed data. When the history summary is "filling," information specifying a filling station, a quantity of fuel supplied, odometer information at the time of filling, and the like are written as detailed data. When the history summary is "repair," a repair shop name, information of repair details, and the like is written as the detailed data. When the history summary is "owner change," the name and address of a new owner and the like are written as the detailed data.

FIG. 9 schematically shows manifest issue data included in the vehicle information database. As an example shown in the drawing, the manifest issue data includes data items such as a manifest issued flag, a waste treatment code, waste generator information, collector/transporter information, intermediate treatment company information, final disposal company information, public keys of the waste generator, the collector/transporter, the intermediate treatment company, and the final disposal company on a vehicle-by-vehicle basis (in terms of each vehicle ID). The manifest issued flag is information indicating whether a manifest has been already issued. The waste treatment code is information indicating whether or not the manifest is issued in paper or electronic form. It should be noted that a secret key corresponding to each of the public keys is held by a computer of each of the disposal service providers. A plurality of generators, collectors/transporters, or companies (for example, intermediate treatment companies) may be involved in each stage in accordance with processing thereof. In that case, public key information of each of the disposal service providers is held in this manifest issue data.

Figure 10:
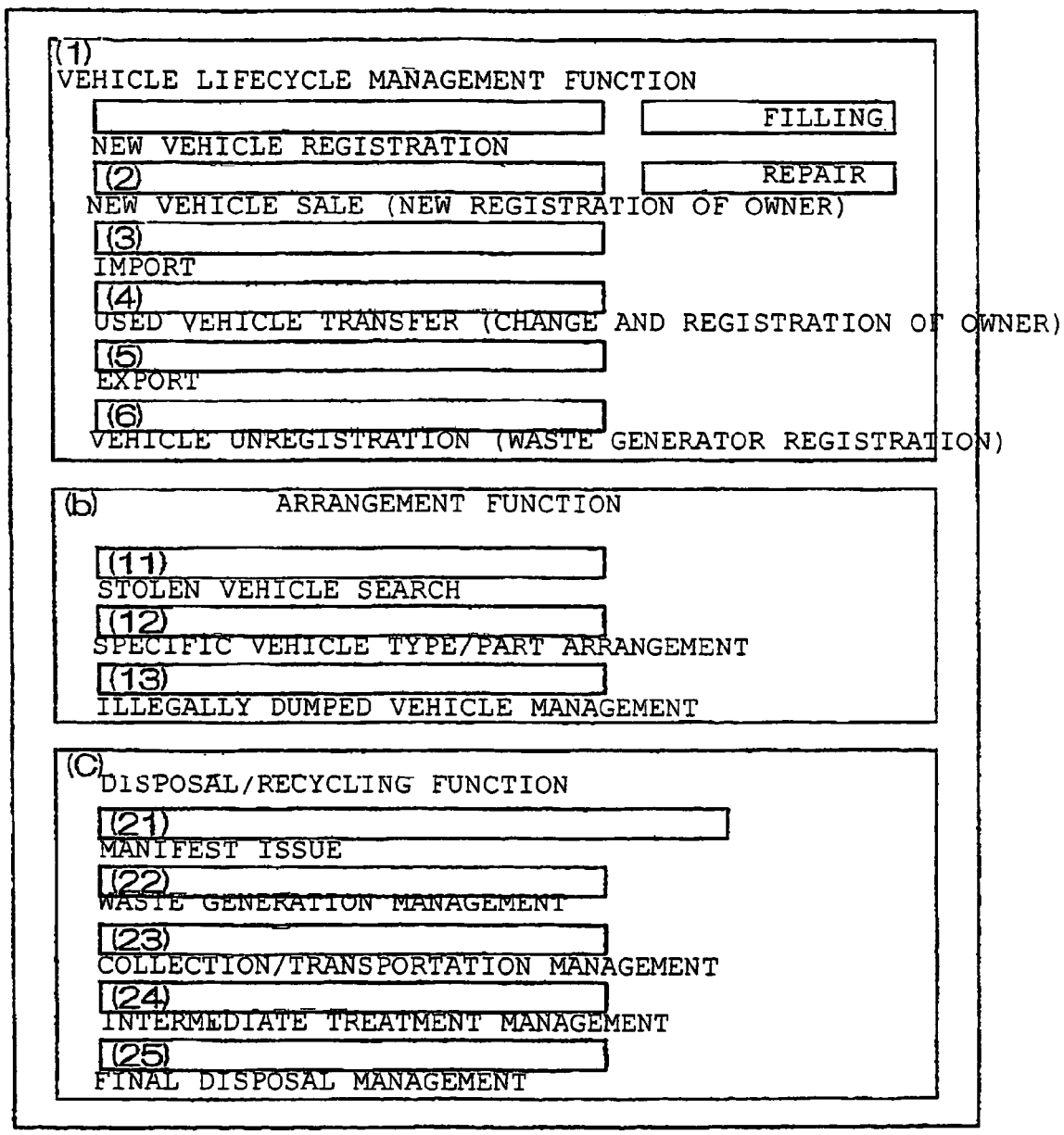
FIG. 10 is a schematic view illustrating a list of functions included in a controller of a vehicle information management server in the embodiment.

FIG. 10 is a schematic view showing a list of functions included by the controller 101 of the vehicle information management server 10. As shown in the drawing, in this embodiment, the controller 101 broadly includes a vehicle lifecycle management functions (a), an arrangement functions (b), and disposal/recycling functions (c).

In more detail, the vehicle lifecycle management functions include functions of (1) new vehicle registration, (2) new vehicle sale (new registration of owners), (3) import, (4) used vehicle transfer (owner change and registration), (5) export, (6) vehicle unregistration information (waste generator registration), (7) filling, (8) repair, and the like. The arrangement functions include (11) stolen vehicle search, (12) specific vehicle type/part arrangement, and (13) illegally dumped vehicle arrangement and the like. In addition, the disposal/recycling functions include functions of (21) manifest issue, (22) waste generation management, (23) collection/transportation management, (24) intermediate treatment management, and (25) final disposal management. A brief description will be given of each function below.

(1) The function of new vehicle registration receives the vehicle ID, the part configuration data, and the like of a new vehicle from the terminals 20 of a vehicle manufacturing plant or the like and registers data of the new vehicle in the vehicle information database 102. At this time, information written in the RFID provided in the vehicle and the RFID embedded in the vehicle registration certificate is simultaneously generated.

(2) The function of new vehicle sale (new registration of owners) receives data such as the name and address of an owner from the terminal 20 of a vehicle dealer, the vehicle sale website server 30, or the like and registers the owner data of the vehicle information database 102.

(3) The function of import performs processing the same as that of the function of used car transfer described later in the case of import from countries (areas) managed by this vehicle management system. In the case where a vehicle is imported from a country (area) not managed by this vehicle management system, the function of import registers the owner data and part configuration data of the vehicle as a new vehicle and registers past history information as the vehicle history data. The functions necessary for processing of the import function are received, for example, from the terminals 20 of the customs offices.

(4) The function of used vehicle transfer (owner change and registration) receives data such as the name and address of an owner after transfer from the terminal 20 of a used vehicle dealer or the like, registers data of a new owner in the vehicle information database 102, and adds vehicle history data.

(5) The function of export performs processing the same as that of the aforementioned used car transfer in the case of export to countries (areas) managed by this vehicle management system. In the case of export to other countries (areas), the owner data is updated or deleted, and the export record is added as the vehicle history data. Functions necessary for processing of the export function are received from, for example, the terminals 20 of the customs offices.

(6) The function of vehicle unregistration (waste generator registration) adds information indicating unregistration as the vehicle history data and performs a process to register the waste generator which is a first agency that contracts for waste disposal in the vehicle information database 102.

(7) From the terminals 20 of the filling stations concerning, the function of filling receives data (information of a quantity of fuel supplied, odometer information, filling location information, and the like) filling and performs a process to register the same as the vehicle history data.

(8) The function of repair receives data concerning repair from the terminals 20 of the repair shops and registers the same as the vehicle history data. In the case where part replacement or the like is performed in repair, the part configuration data of the vehicle information database is also updated.

(11) In the case of vehicle theft or the like, the function of stolen article search performs search for a stolen article by the vehicle ID thereof. Information for searching for a stolen article is transmitted to the terminals 20 of the customs offices, repair shops, and filling stations. For example, in a filling station, it is designed to allow the vehicle ID to be read from the RFID provided in a vehicle at the position where the vehicle stops for filling, and to allow the vehicle ID read from the RFID of the vehicle to be compared to the vehicle ID of the stolen vehicle search information. In addition, it may be designed to stop filling and notify information in the location of that filling station of the vehicle information management server side when both match each other as a result of comparison. This makes it relatively easy to know the whereabouts of the stolen vehicle.

(12) For example, in the case where parts of a specific lot come near the end of life, the function of specific vehicle type/part arrangement specifies vehicles including those parts by searching the part configuration data within the vehicle information database 102 and obtains the owner data of the vehicles. This enables information of part replacement and the like to be sent to the owners. In addition, the vehicle history data is designed to include a history of vehicle inspection, a history of replacement of parts such as tires, a history of maintenance or checking, and the like. This enables information regarding the next vehicle inspection, part replacement, checking and the like to be sent when a predetermined period of time has passed after the last inspection, part replacement, checking, and the like based on the vehicle history data. These pieces of information may be sent to the addresses of the owners by post. Alternatively, it may be designed to hold e-mail addresses as owner data and send information to the e-mail addresses by e-mail. In addition, for example, it may be designed to send information to owners for adding a function to software in a part with control means by software embedded therein other than the case of the end of life of parts.

(13) The function of illegally dumped vehicle management outputs information on vehicles illegally dumped. For example, when an illegally dumped vehicle is found, the vehicle ID is read from the RFID provided in the vehicle using a handy terminal (portable terminal) or the like at the dumping site. The controller 101 reads the vehicle history data or the owner data of the vehicle of interest from the vehicle information database 102. If the vehicle has been already unregistered and passed to a disposal process, the state of the waste treatment is tracked based on the data written in the vehicle information database 102 by means of the disposal/recycling functions described later.

Figure 11:
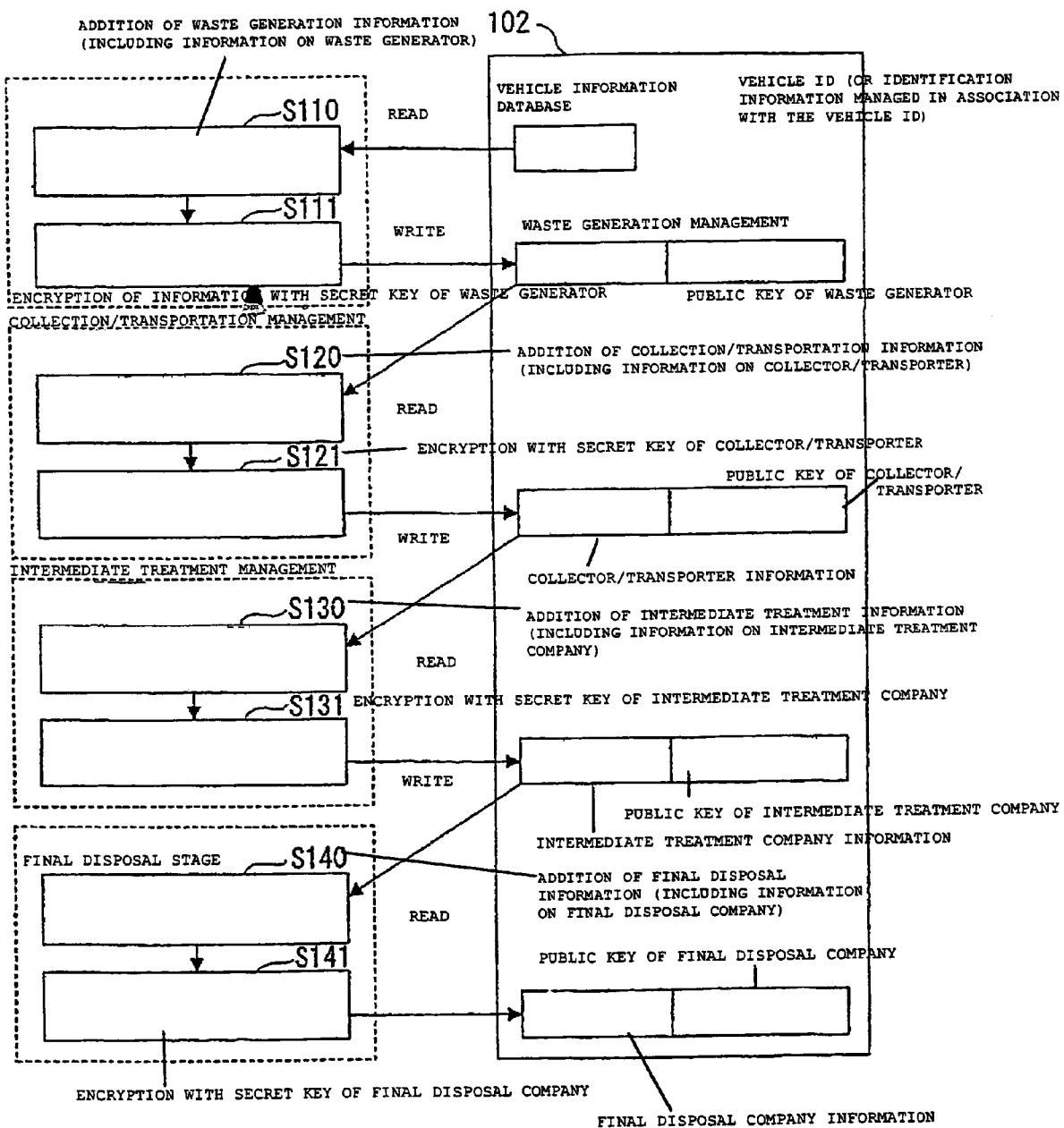
FIG. 11 is a schematic view illustrating processing and a data flow of disposal/recycling functions in the embodiment.

A description will now be given of the disposal/recycling functions. FIG. 11 is a schematic view showing processing and data flow in the disposal/recycling functions. In FIG. 11, waste generation management, collection/transportation management, intermediate treatment management, and final disposal management are functions included by the controller 101. It should be noted that that the processing shown in this drawing is based on the premise that an electronic manifest has been already issued. Specifically, when the process of vehicle unregistration is performed, the process of manifest issue is performed in conjunction therewith, and the manifest (manifest data) as electronic data is recorded in the vehicle information database 102. This manifest data includes a vehicle ID, and the vehicle ID associates the manifest data with the other data within the vehicle information database. It should be noted that the manifest data may be recorded and held in another recoding area within the vehicle management server 10 or in a recording medium (not shown) such as a magnetic disk within another computer instead of being held in the vehicle database 102.

Hereinafter, a description will be given along the flow in FIG. 11. First, the waste generation management function included by the controller 101 reads the vehicle ID of a vehicle to be disposed of from the vehicle information database 102 and adds the waste generation information (including information on the waste generator) thereto (step S110). Subsequently, the waste generation management function sends information including this vehicle ID and the waste generation information to the terminal 20 of the waste generator via the communication network 80 and asks for encryption thereof. The waste generator side encrypts this information with the secret key of the waste generator and returns the same to the waste generation management function of the controller 101. The waste generation management function writes the returned encrypted information in the vehicle information database 102 as the waste generator information and also writes the public key of the waste generator in the vehicle information database 102 (step S111).

Subsequently, the collection/transportation management function included by the controller 101 reads the waste generator information from the vehicle information database 102 and adds the collection/transportation information (including information on the collector/transporter) thereto (step S120). The collection/transportation management function sends the information after the addition to the terminal 20 of the collector/transporter via the communication network 80 and asks for encryption thereof. The collector/transporter side encrypts this information with the secret key of the collector/transporter and returns the same to the collection/transportation function of the controller 101. The collection/transportation function writes the returned encrypted information in the vehicle information database 102 as the collector/transporter information and also writes the public key of the collector/transporter information in the vehicle information database 102 (step S121).

Subsequently, the intermediate treatment management function included by the controller 101 reads the collector/transporter information from the vehicle information database 102 and adds the intermediate treatment information (including information on the intermediate treatment company) thereto (step S130). The intermediate treatment management function then sends this information after the addition to the terminal 20 of the intermediate treatment company via the communication network 80 and asks for encryption thereof. The intermediate treatment company side encrypts this information with the secret key of the intermediate treatment company and returns the same to the intermediate treatment management function of the controller 101. The intermediate treatment management function writes the returned encrypted information in the vehicle information database 102 as the intermediate treatment company information and also writes the public key of the intermediate treatment company in the vehicle information database 102 (step S131).

Subsequently, the final disposal management function included by the controller 101 reads the intermediate treatment company information from the vehicle information database 102 and adds the final disposal information (including information on the final disposal company) thereto (step S140). The final disposal management function sends this information after the addition to the terminal 20 of the final disposal company via the communication network 80 and asks for encryption thereof. The final disposal company side encrypts this information with the secret key of the final disposal company and returns the same to the final disposal management function of the controller 101. The final disposal management function writes the returned encrypted information in the vehicle information database 102 as the final disposal company information and also writes the public key of the final disposal company in the vehicle information database 102 (step S141).

Managing information on waste by performing the processing from the step S110 to the step S141 according to each level of the waste treatment as described above enables the information on the state of the disposal treatment to be managed in an integrated fashion. In addition, the information is encrypted with the secret key of each disposal service provider. Accordingly, the information is surely guaranteed to be information added by the appropriate disposal service provider by decrypting the information with the corresponding public key. It is thus possible to hold information adequate for accurately tracking the processes of the waste treatment in the vehicle information database. In addition, the information on the waste treatment is associated with the vehicle ID of the vehicle of interest, and the vehicle ID corresponds to the vehicle ID, which is written in the RFID provided in the vehicle registration certificate or the vehicle itself This ensures identification of the individual vehicle to be disposed of as waste.

It should be noted that the example of FIG. 11 is based on the premise that the processes are sequentially performed in the order of the waste generator, the collector/transporter, the intermediate treatment company, and the final disposal company, but the processes are not necessarily performed in this order. The information of each of the disposal/recycling service providers can be encrypted and added step by step. For example, a single disposal service provider may perform both the collection/transportation and the intermediate treatment together, or the intermediate treatment may be separated in a plurality of stages performed by a plurality of disposal service providers. In addition, different treatment companies may be involved according to materials constituting the waste or the like.

Each of the vehicle information management server 10, terminals 20, portable terminal 21, vehicle sale website server 30, and the like includes a computer system inside. Each process of processing of the aforementioned vehicle information management is stored in a computer-readable recording medium in the form of a computer program. Each computer reads and executes the program to perform the aforementioned processing. The computer-readable recording medium can be a magnetic disk, a magneto-optical disk, a CD-ROM, a DVD-ROM, a semiconductor memory, or the like. The computer program may be distributed to the computer through a communication line and executed by the computer that has received the distribution.

The embodiment of the present invention has been described above with reference to the drawings, but the concrete constitution is not limited to this embodiment and may includes a design and the like without departing from the scope of this invention.

As described above, according to this present invention, the tag read/write signals (electromagnetic waves) are transmitted through the resin member because the tag (RFID) is attached inside the resin member. Therefore, information of the tag can be easily read and written using the tag reader/writer. In addition, since the tag is attached inside the vehicle seat composed of a resin member, space within the vehicle seat can be efficiently utilized. In other words, there is an advantage that less design restrictions are newly applied compared to the case where the tag is provided on the chassis frame or the like. In addition, providing the tag inside the seat is advantageous from the perspective of water resistance, ultraviolet resistance, and the like and can prevent the tag from being deteriorated. Furthermore, since the tag is hardly removed, there is an advantage that the tag is unlikely to be removed by vibration or the like or to be stolen.

Furthermore, when the vehicle is a saddle type vehicle, the seat is exposed to the exterior space. Therefore, there are fewer obstacles to electromagnetic waves, and information of the tag can be easily read and written even from right above the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle, comprising:
    a tag being mounted in the vehicle, the tag including a recording medium in which identification information for identifying the vehicle is registered,
    wherein the tag is attached inside a vehicle seat to be sat on by a user in the vehicle, said vehicle seat being composed of a resin member,
    wherein the vehicle seat is a primary vehicle seat that is directly attached the vehicle, and
    wherein the tag is located adjacent to a front of the seat or is located adjacent to a rear of the seat, so that a distance between the tag and an outside of the seat is small, such that the identification information of the vehicle can be obtained via a tag reader placed near the tag attached inside the primary vehicle seat,
    wherein the vehicle seat includes an internal member extending between the front side and the rear side of the vehicle seat,
    wherein a front side of the internal member faces substantially in a forward direction, and a rear side of the internal member faces substantially in a rearward direction,
    wherein the tag is disposed either on the front side of the internal member or is disposed on the rear side of the internal member.

2. The vehicle according to claim 1, wherein the vehicle is a saddle-type vehicle.

3. The vehicle according to claim 1, wherein the tag is an RFID tag including an IC and means for transmitting/receiving radio signal embedded therein.

4. The vehicle according to claim 1, wherein the tag is aligned in a direction that is substantially orthogonal to a portion of a seat surface of the seat to be sat on by the user of the vehicle.

5. A vehicle, comprising:
    a vehicle body;
    a vehicle seat composed of a resin member attached to said vehicle body, said vehicle seat to be sat on by a user in the vehicle; and
    a tag attached inside said resin member of said vehicle seat, said tag including a recording medium in which identification information for identifying the vehicle is registered,
    wherein the vehicle seat is a primary vehicle seat that is directly attached the vehicle, and
    wherein the tag is located adjacent to a front of the seat or is located adjacent to a rear of the seat so that a distance between the tag and an outside of the seat is small, such that the identification information of the vehicle can be obtained via a tag reader placed near the tag attached inside the primary vehicle seat,
    wherein the vehicle seat includes an internal member extending between the front side and the rear side of the vehicle seat,
    wherein a front side of the internal member faces substantially in a forward direction, and a rear side of the internal member faces substantially in a rearward direction,
    wherein the tag is disposed either on the front side of the internal member or is disposed on the rear side of the internal member.

6. The vehicle according to claim 5, wherein the vehicle is a saddle-type vehicle.

7. The vehicle according to claim 5, wherein the tag is an RFID tag including an IC and means for transmitting/receiving radio signal embedded therein.

8. The vehicle according to claim 5, wherein the tag is aligned in a direction that is substantially orthogonal to a portion of a seat surface of the seat to be sat on by the user of the vehicle.

9. A resin member for a vehicle, comprising:
    a tag attached inside the resin member, said tag including a recording medium in which identification information for identifying the vehicle is registered,
    wherein the resin member is a vehicle seat to be sat on by a user in the vehicle,
    wherein the vehicle seat is a primary vehicle seat that is directly attached the vehicle, and
    wherein the tag is located adjacent to a front of the seat or is located adjacent to a rear of the seat so that a distance between the tag and an outside of the seat is small, such that the identification information of the vehicle can be obtained via a tag reader placed near the tag attached inside the primary vehicle seat,
    wherein the vehicle seat includes an internal member extending between the front side and the rear side of the vehicle seat,
    wherein a front side of the internal member faces substantially in a forward direction, and a rear side of the internal member faces substantially in a rearward direction,
    wherein the tag is disposed either on the front side of the internal member or is disposed on the rear side of the internal member.

10. The resin member according to claim 9, wherein the tag is an RFID tag including an IC and means for transmitting/receiving radio signal embedded therein.

11. The resin member according to claim 9, wherein the tag is aligned in a direction that is substantially orthogonal to a portion of the seat surface of the seat to be sat on by the user of the vehicle.

* * * * *